United States Patent [19]

Willey

[11] 4,272,232

[45] Jun. 9, 1981

[54] PARTICLE BLENDER

[75] Inventor: Melvin G. Willey, Knoxville, Tenn.

[73] Assignee: The United States of America as represented by the United States Department of Energy, Washington, D.C.

[21] Appl. No.: 64,592

[22] Filed: Aug. 7, 1979

[51] Int. Cl.³ .............................................. B29B 1/04
[52] U.S. Cl. .................................... 425/200; 425/256
[58] Field of Search ...................... 425/200, 447, 256; 264/0.5; 252/301.1 R

[56] References Cited

U.S. PATENT DOCUMENTS

| | | | |
|---|---|---|---|
| 2,593,665 | 4/1952 | Glassen | 425/200 |
| 2,839,787 | 6/1958 | Stevens | 425/447 |
| 3,537,156 | 11/1970 | Glass | 425/200 |
| 4,119,304 | 10/1978 | Groom | 425/200 |

Primary Examiner—Donald E. Czaja
Assistant Examiner—W. Thompson

Attorney, Agent, or Firm—Louis M. Deckelmann; Stephen D. Hamel; James E. Denny

[57] ABSTRACT

An infinite blender that achieves a homogeneous mixture of fuel microspheres is provided. Blending is accomplished by directing respective groups of desired particles onto the apex of a stationary coaxial cone. The particles progress downward over the cone surface and deposit in a space at the base of the cone that is described by a flexible band provided with a wide portion traversing and in continuous contact with the circumference of the cone base and extending upwardly therefrom. The band, being attached to the cone at a narrow inner end thereof, causes the cone to rotate on its arbor when the band is subsequently pulled onto a take-up spool. As a point at the end of the wide portion of the band passes the point where it is tangent to the cone, the blended particles are released into a delivery tube leading directly into a mold, and a plate mounted on the lower portion of the cone and positioned between the end of the wide portion of the band and the cone assures release of the particles only at the tangent point.

10 Claims, 1 Drawing Figure

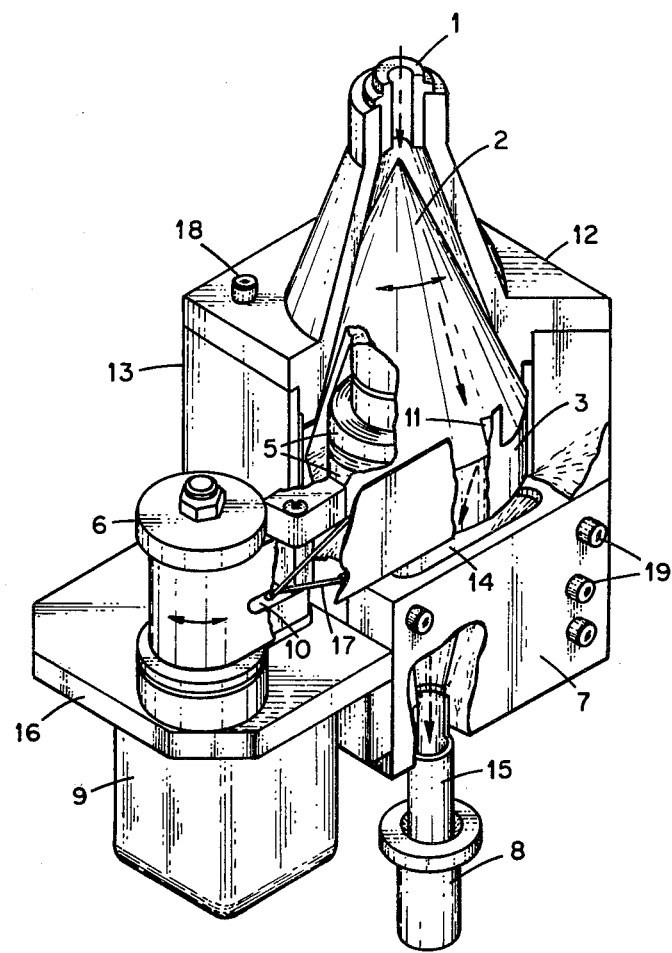

PARTICLE BLENDER

BACKGROUND OF THE INVENTION

The present invention relates to the blending of various desired microspheres in the fabrication of fuel rods for use in a high temperature gas-cooled reactor (HTGR), and more particularly to the homogeneous mixing of such microspheres to achieve a desired uniform distribution of the microspheres in the final fuel element. It is a result of a contract with the U.S. Department of Energy.

The fuel element for the HTGR is a graphite body into which a multiplicity of fuel rods is placed. The individual fuel rods are, in turn, a blend of three types of particles held together with a carbonaceous matrix. The particles may be, for example, relatively large carbon-coated $ThO_2$ having a density of about 3.5 g/cc, small carbon-coated $UO_2$ having a density of about 2.5 g/cc$^2$, and inert carbon or graphite particles having a density of about 1.7 g/cc. These particles must be blended to achieve uniform distribution and infiltrated with a binder.

The Oak Ridge National Laboratory method of producing fuel rods units involves placing a blended mixture of the desired microspheres in a mold and injecting, from the top of the mold, a heated binder to infiltrate the particles in a manner as described in U.S. Pat. No. 3,714,305 to F. C. Davis et al, issued Jan. 30, 1973, and having a common assignee with the present application. After cooling, the "green" fuel rod is removed from the mold and the binder is carbonized using one of several conventional methods. Similar steps are utilized by Gulf General Atomic in their production of HTGR fuel rods.

A problem in the manufacture of the fuel elements is created by an inadequate blending of the microspheres. Another problem is created by the tendency of the microspheres to resegregate during transport from the point of blending to the mold. Due to differences in density, size, shape, and surface finish of the particles, vibration of handling equipment causes resegregation resulting in inhomogeneity in the final fuel element, and any significant departure from a uniform distribution of the blended particles in the final fuel element is undesirable.

It is the primary object of the present invention to provide an apparatus for the blending of particles of differing size and density and introducing the resultant blended particles into a container (mold) with a minimum of resegregation of any type of particle.

Other objects, advantages and novel features of the invention will become apparent to those skilled in the art upon examination of the following detailed description of a preferred embodiment of the invention and the accompanying drawing.

SUMMARY OF THE INVENTION

Blending is accomplished in the present invention by directing respective groups of desired particles onto the apex of a stationary coaxial cone. The particles progress downward over the cone surface and deposit in a space at the base of the cone that is described by a flexible band provided with a wide portion traversing and in continuous contact with the circumference of the cone base and extending upwardly therefrom. The band, being attached to the cone base at a narrow inner end therof, causes the cone to rotate on its arbor when the band is subsequently pulled onto a takeup spool. As the end of the wide portion of the band passes the point where it is tangent to the cone and overlap ceases, the particles are blended as they are released into a delivery tube leading directly into a mold. A plate mounted on the lower portion of the cone and positioned between the end of the wide portion of the band and the cone assures release of the particles only at the tangent point. Depositing the blended particles directly into the mold assures a minimum of resegregation of the particles by eliminating much of the adverse effect of equipment vibration.

BRIEF DESCRIPTION OF THE DRAWING

The single FIGURE is an isometric, cut-away view of the particle blender of the present invention.

DESCRIPTION OF THE PREFERRED EMBODIMENT

The particle blender of the present invention is shown in the single FIGURE of the drawings which will be described.

A main housing 13 has mounted on the top thereof a cover member 12 affixed to the housing 13 by means of a plurality of screws 18, only one being shown. The member 13 is provided with a tapered, hollow, upright portion with a particle columnating tube 1 mounted in the upper end thereof, and a portion of the interior of the upright portion is provided with a tapered wall spaced from and encompassing a cone 2 with its apex being axially aligned with the columnating tube 1.

The cone 2 is attached to and coaxial with a cylindrical base portion, and a flexible band 3 provided with a wide portion extending above the cone base portion is wrapped around and attached to the cone base portion at a narrowed down inner end thereof. The outermost end of the wide portion of the flexible band 3 is attached to a take-up spool 6 mounted on a plate 16. The spool 6 is driven by a reversible motor 9 mounted under the plate 16, and the band 3 is adapted to be pulled by the motor 9 in a direction tangent to the cone base as the band is wound onto the take-up spool. The plate 16 is mounted to the main housing 13.

A particle exit chamber 7 is mounted to a lower portion of the housing 13 by means of a plurality of screws 19. The chamber 7 is provided with an internal particle receiving passageway provided with a top opening 14 and a lower opening coupled to a particle exit tube 15 for feeding the particles from the blender into a mold 8. The opening 14 is positioned just below the base of the cone 2 at the outer periphery thereof.

Mounted within the cone 2 are a pair of cone return springs 5 such that as the cone is rotated on its arbor, not shown, while the band 3 is wound onto the take-up spool 6 by the motor 9, the return springs 5 are torqued, and after a 360° cycle, the motor 9 is de-energized and the springs 5 rotate the cone back to its original position which may be aided, if desired, by energizing the motor 9 to rotate in an opposite direction at this time.

The band 3 is provided with a pair of slots 10, only one being shown, with each respective slot being positioned near each respective end of the band, and a spring 17 is biased and positioned in such a manner as to fall into one or the other of these slots for operating a micro switch for controlling the operation of the motor 9.

Mounted on the lower portion of the cone 2 is a triangular plate 11 with a vertical edge thereof abutting against the inner end of the inner surface of the wide portion of the band 3. It should be noted that the inner end of the band 3 that is attached to the cone base is narrowed down just past the point where the plate 11 abuts against the inner end of the wide portion of the band 3. When the band 3 is being wound onto the take-up spool, the point where the end of the wide portion of the band 3 and the plate 11 directly therebehind become tangent to the cone base becomes a release point for the particles from the blender into the opening 14 of the exit chamber 7. It should be noted that the position of the tape 3 and the plate 11, as shown in the drawing, is shown after a complete 360° rotation of the cone 2 has taken place for the sake of clarity, it being understood that before the cone has been rotated the wide portion of this tape is completely wrapped around the cone past the particle release point, thereby forming a trough between the tape and the cone which extends completely around the latter from one side of plate 11 to the opposite side of the plate.

In the operation of the above-described blender, the respective particles to be blended are fed into the vertical columnating tube 1 to fall onto the apex of the coaxial cone 2 which is stationary at this time. The particles move down the surface of the cone and come to rest against the wide portion of the flexible band 3. The ring of deposited particles between the cone and the wide portion of the band is triangular in cross section, the apex thereof oriented downward. The first group of particles entering the blender occupies the lower portion of the cross section progressing upward, and the last group of particles entering the blender being in the top plane of the cross section. Plate 11 is initially located adjacent the particle release point and when cone 2 is rotated 360° the plate returns to the particle release point as illustrated in the drawing.

The motor 9 is then energized to drive the take-up spool 6, and the outermost end of the band 3, being attached to the take-up spool, is pulled by the motor 9 in a direction tangent to the cylindrical cone base as the band is wound onto the take-up spool. Thus, the cone 2 is rotated on its arbor and the cone return springs 5 are torqued. As the band 3 is payed out, the point at which the end of the wide portion of the band and the plate 11 directly back thereof become tangent to the base of the cone becomes a release point for the blended particles into the opening 14 of the exit chamber 7 which directs the released particles through the exit tube 15 into the mold 8. Thus, at the tangent point, and when the band 3 is no longer in contact with and supporting the particles between it and the cone, the particles are allowed to fall into opening 14 of the unit 7 as indicated by the broken line arrow located on the drawing where band 3 is cut away adjacent cone 2. The triangular plate 11 acts as a dam and prevents back falling of particles into opening 14 as cone 2 is being rotated and particles are being moved clockwise, as viewed from above in the drawing, to their discharge point where band 3 moves away from cone 2. Thus, the particles are released only at the tangent point and this action progresses constantly for a 360° rotation of the cone until the plate 11 again reaches the tangent point, and the particles being discharged comprise a stream all portions of which contain the different particles in the proportions established by the particle layers successively placed in the substantially 360° trough initially existing between cone 2 and band 3. The time interval for completing the 360° rotation of the cone and the winding of the tape onto the take-up spool is about 5-6 seconds, for example. At the end of the 360° cycle, the cone return springs 5 rotate the cone back to its original position aided by the motor 9, if such is needed or required, by energizing the motor 9 to rotate in the opposite direction which may be controlled by action of the spring 17 and the tape slot 10 as described above. The blender is then ready to be again operated in the above manner to fill another mold 8.

By depositing the particles released by the blender directly into a mold, much of the adverse effect of equipment vibration, that was a problem in the prior art, is essentially eliminated, thus assuring a minimum of resegregation of the particles and effecting a uniform distribution of blended particles within the mold.

The above-described blender has utility in any process where blending or mixing of free-flowing materials is essential, such as plastics and coloring agents or in pharmaceuticals.

The foregoing description of a preferred embodiment of the invention has been presented for purposes of illustration and description and is not intended to be exhaustive or to limit the invention to the precise form disclosed. It was chosen and described in order to best explain the principles of the invention and their practical application to thereby enable others skilled in the art to best utilize the invention in various embodiments as are suited to the particular use contemplated. It is intended that the scope of the invention be defined by the claims appended hereto.

What is claimed is:

1. A particle blending device comprising:
   a vertically disposed cone mounted for rotation about its central axis;
   a flexible band connected adjacent one of its ends to said cone and extending circumferentially thereof to form therewith a trough for receiving particles, the other end of said band being pulled so that said cone is rotated and said band moves away from its surface at a predetermined spatial point, whereby particles deposited in said trough are permitted to fall at said point.

2. The device of claim 1 including a cylindrical base coaxially attached to the base of said cone and rotatable therewith, said band being connected to said cone by attachment to said base.

3. The particle blending device of claim 2 including means for pulling said band to thereby rotate said cone.

4. The particle blending device of claim 3 wherein said band pulling means comprises a rotatable spool connected to the band.

5. The particle blending device of claim 4 including means for counter-rotating said cone after it has been rotated.

6. The particle blending device of claim 5 wherein said cone counter-rotating means comprises a spring.

7. The particle blending device of claim 6 including a particle feed conduit coaxial with said cone and having its lower end disposed adjacent the apex thereof.

8. The particle blending device of claim 7 including means disposed below said cone and said band for receiving particles falling at said point.

9. A device for blending particles, comprising:
   a vertically disposed cone mounted for rotation about its central axis;
   a cylindrical base coaxially attached to the base of said cone and rotatable therewith;

means for depositing particles on said cone adjacent its apex;

a take-up spool mounted adjacent said housing for rotation about an axis parallel with the axis of rotation said cone and said base;

a flexible band extending circumferentially of said cone and said base in a particle receiving configuration of said device, the ends of said band being respectively connected to said base and said spool, said band projecting upwardly from said base to form with said cone a trough for holding particles discharged on said cone from said particle depositing means;

means for rotating said spool to thereby pull said band in a direction tangent to said base at a predetermined spatial point, whereby said base and cone are rotated and particles are permitted to slide off said cone adjacent said point; and means for receiving particles sliding off said cone adjacent said point.

10. The device of claim 9 including means for counter-rotating said cone after particles in said trough have been discharged into said particle receiving means.

* * * * *